(12) United States Patent
Lin

(10) Patent No.: US 12,505,843 B2
(45) Date of Patent: Dec. 23, 2025

(54) AUDIO PROCESSING METHOD, DEVICE, ELECTRONIC APPARATUS, AND STORAGE MEDIUM

(71) Applicant: Lenovo (Beijing) Limited, Beijing (CN)

(72) Inventor: Qingjian Lin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 295 days.

(21) Appl. No.: 18/180,324

(22) Filed: Mar. 8, 2023

(65) Prior Publication Data

US 2023/0352030 A1    Nov. 2, 2023

(30) Foreign Application Priority Data

Mar. 30, 2022  (CN) .......................... 202210323184.X

(51) Int. Cl.
| | | |
|---|---|---|
| *G10L 15/07* | (2013.01) | |
| *G10L 17/02* | (2013.01) | |
| *G10L 17/04* | (2013.01) | |
| *G10L 17/06* | (2013.01) | |

(52) U.S. Cl.
CPC .............. *G10L 17/04* (2013.01); *G10L 17/02* (2013.01); *G10L 17/06* (2013.01)

(58) Field of Classification Search
None
See application file for complete search history.

(56) References Cited

U.S. PATENT DOCUMENTS

| | | | | |
|---|---|---|---|---|
| 10,997,609 | B1* | 5/2021 | Wang | .................. H04L 61/5007 |
| 2019/0279646 | A1* | 9/2019 | Tian | ......................... G10L 15/20 |
| 2020/0043471 | A1* | 2/2020 | Ma | ............................ G10L 15/07 |
| 2020/0312337 | A1* | 10/2020 | Stafylakis | ............... G10L 17/00 |
| 2023/0315993 | A1* | 10/2023 | Nieborowski | .......... G06F 16/35 |
| | | | | 704/9 |
| 2025/0061398 | A1* | 2/2025 | Pelz | ................. G06Q 10/06313 |

* cited by examiner

*Primary Examiner* — Jakieda R Jackson
(74) *Attorney, Agent, or Firm* — ANOVA LAW GROUP, PLLC

(57) ABSTRACT

An audio processing method including obtaining to-be-processed audio data at the current moment and extracting a current voiceprint feature online from the to-be-processed audio data, obtaining at least one historical cluster at a moment before the current moment, performing offline clustering on the current voiceprint feature based on the at least one historical cluster to obtain the current cluster, based on the user label associated with the historical cluster and the user label associated with the current cluster, determining a user label mapping relationship online; and based on the user label mapping relationship, updating the user label of the user to whom the current voiceprint feature belongs online in the current cluster, and outputting an updated user label of the current voiceprint feature. The at least one historical cluster is obtained by clustering at least one historical voiceprint feature corresponding to at least one historical user.

18 Claims, 9 Drawing Sheets

AUDIO PROCESSING METHOD, DEVICE, ELECTRONIC APPARATUS, AND STORAGE MEDIUM

CROSS-REFERENCE TO RELATED APPLICATION

This application claims priority to Chinese Patent Application No. 202210323184.X, filed on Mar. 30, 2022, the entire content of which is incorporated herein by reference.

TECHNICAL FIELD

The present disclosure relates to the audio-processing technology field and, more particularly, to an audio-processing technology method, a device, an electronic apparatus, and a storage medium.

BACKGROUND

In some application scenarios, audio data of a same user needs to be clustered as one category from continuous multi-user audio data, and a corresponding user label is outputted.

It is desired to accurately and efficiently cluster the audio data and output the corresponding user label.

SUMMARY

Embodiments of the present disclosure provide an audio processing method. The method includes obtaining to-be-processed audio data at the current moment and extracting a current voiceprint feature online from the to-be-processed audio data, obtaining at least one historical cluster at a moment before the current moment, performing offline clustering on the current voiceprint feature based on the at least one historical cluster to obtain the current cluster, based on the user label associated with the historical cluster and the user label associated with the current cluster, determining a user label mapping relationship online; and based on the user label mapping relationship, updating the user label of the user to whom the current voiceprint feature belongs online in the current cluster, and outputting an updated user label of the current voiceprint feature. The at least one historical cluster is obtained by clustering at least one historical voiceprint feature corresponding to at least one historical user. Each historical cluster corresponds to at least one historical voiceprint feature of one historical user and is associated with a user label of the historical user. The current cluster is associated with a user label of a user to whom the voiceprint feature corresponding to the current cluster belongs. The current cluster includes at least one cluster corresponding to the current voiceprint feature.

Embodiments of the present disclosure provide an audio processing device, including an extraction module, an acquisition module, a clustering module, a determination module, an update module, and an output module. The extraction module is configured to obtain to-be-processed audio data at the current moment, and extract a current voiceprint feature online from the to-be-processed audio data. The acquisition module is configured to obtain at least one historical cluster at a moment before the current time. The at least one historical cluster is obtained by clustering at least one historical voiceprint feature corresponding to at least one historical user. Each historical cluster corresponds to at least one historical voiceprint feature of one historical user and is associated with a user label of the historical user. The clustering module is configured to perform offline clustering on the current voiceprint feature based on the at least one historical cluster to obtain the current cluster. The current cluster is associated with a user label of a user to whom the voiceprint feature corresponding to the current cluster belongs. The current cluster includes at least one cluster corresponding to the current voiceprint feature. The determination module is configured to, based on the user label associated with the historical cluster and the user label associated with the current cluster, determine a user label mapping relationship online. The update module is configured to, based on the user label mapping relationship, update the user label of the user to whom the current voiceprint feature belongs online in the current cluster. The output module is configured to at least output the updated user label of the current voiceprint feature.

Embodiments of the present disclosure provide an electronic apparatus, including a memory and a processor. The memory is coupled with the processor and stores an instruction set that, when executed by the processor, causes the processor to obtain to-be-processed audio data at the current moment and extract a current voiceprint feature online from the to-be-processed audio data, obtain at least one historical cluster at a moment before the current moment, perform offline clustering on the current voiceprint feature based on the at least one historical cluster to obtain the current cluster, based on the user label associated with the historical cluster and the user label associated with the current cluster, determine a user label mapping relationship online; and based on the user label mapping relationship, update the user label of the user to whom the current voiceprint feature belongs online in the current cluster, and output an updated user label of the current voiceprint feature. The at least one historical cluster is obtained by clustering at least one historical voiceprint feature corresponding to at least one historical user. Each historical cluster corresponds to at least one historical voiceprint feature of one historical user and is associated with a user label of the historical user. The current cluster is associated with a user label of a user to whom the voiceprint feature corresponding to the current cluster belongs. The current cluster includes at least one cluster corresponding to the current voiceprint feature.

DETAILED DESCRIPTION OF THE EMBODIMENTS

The technical solutions of embodiments of the present disclosure are clearly and completely described below in connection with the accompanying drawings of embodiments of the present disclosure. Obviously, described embodiments are only some embodiments of the present disclosure, not all embodiments. Based on embodiments of the present disclosure, all other embodiments obtained by those of ordinary skill in the art without creative efforts shall be within the scope of the present disclosure.

Figure 1:
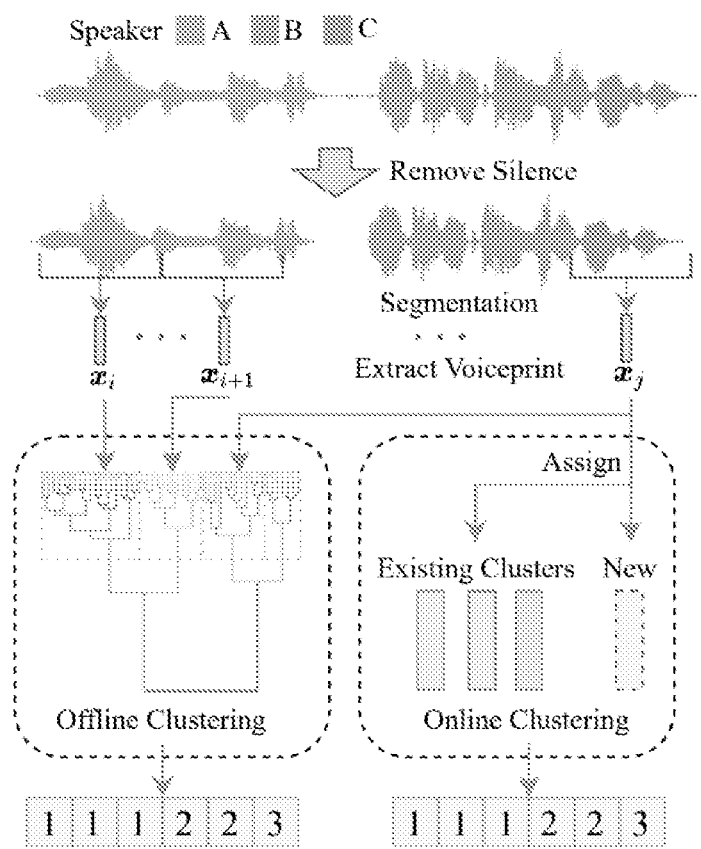
FIG. 1 illustrates a schematic scenario diagram of an existing clustering method.

To cluster audio data of a same user into one category from continuous multi-user audio data, an offline clustering method or an online clustering shown in FIG. 1 is used for clustering.

The inventors find that, in the offline clustering method, clustering is performed based on all audio data after obtaining all the audio data ($x_i, \ldots, x_{i+1}$, and $x_j$ in FIG. 1). This method cannot satisfy a real-time requirement.

However, in the online clustering method, one piece of audio data can be obtained each time online ($x_j$ in FIG. 1), and clustering between the audio data and the previous audio data (Existing clusters in FIG. 1) is performed. Clustering accuracy depends on the quality of initial clustering. If an audio of a same speaker is initially classified into two categories, an irreversible cumulative error can be caused later.

In an analysis process of the above existing clustering method, the inventors find that neither the above offline clustering method nor the online clustering method can guarantee the accuracy and efficiency of clustering simultaneously. Therefore, the inventors provide a new audio data method to solve the above problems.

Figure 2:
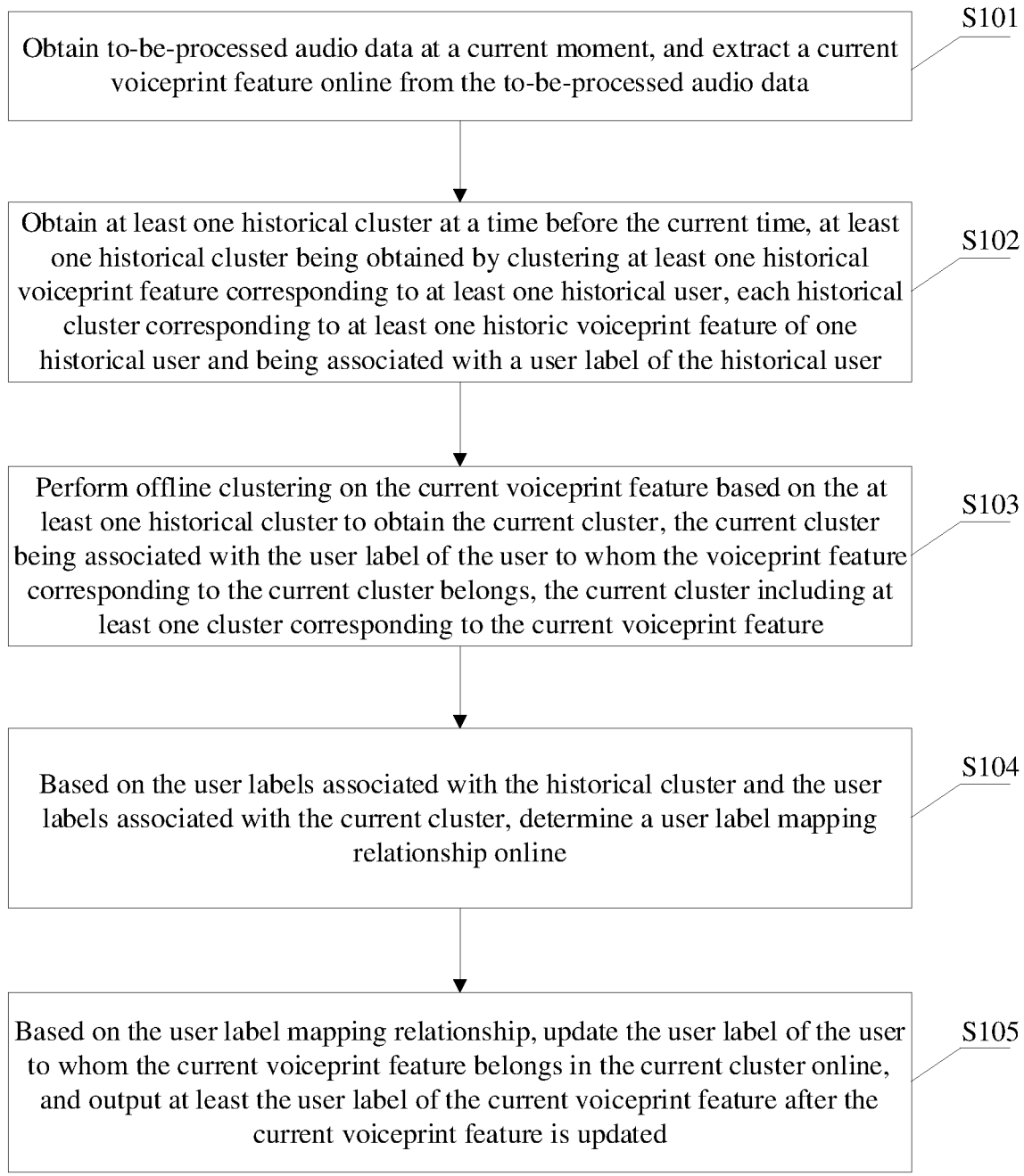
FIG. 2 illustrates a schematic flowchart of an audio processing method according to some embodiments of the present disclosure.

FIG. 2 illustrates a schematic flowchart of an audio processing method according to some embodiments of the present disclosure. A data processing method of the present disclosure can be applied to an electronic apparatus. The product type of the electronic apparatus is not limited to the present disclosure. As shown in FIG. 2, the method includes but is not limited to the following processes.

At S101, to-be-processed audio data is obtained at a current moment, and a current voiceprint feature is extracted online from the to-be-processed audio data.

The to-be-processed audio data at the current moment can include at least one piece of audio data of at least one user.

In some embodiments, the voiceprint feature can be extracted from the to-be-processed audio data using a voiceprint recognition model. The extracted voiceprint feature can be used as the current voiceprint feature.

Extracting the voiceprint feature of the user online from the to-be-processed audio data can include deleting noise data online from the to-be-processed audio data to obtain target data and extracting the voiceprint feature from the target data.

The current voiceprint feature can be extracted online from the to-be-processed audio data to ensure a real-time performance of the current voiceprint feature.

At S102, at least one historical cluster at a moment before the current moment is obtained. At least one historical cluster is obtained by clustering at least one historical voiceprint feature corresponding to at least one historical user. Each historical cluster corresponds to at least one historic voiceprint feature of one historical user and is associated with a user label of the historical user.

Obtaining the at least one historical cluster at the moment before the current moment includes obtaining a plurality of historical voiceprint features before the current moment (S1021).

This process can include obtaining historical audio data before the current moment. The historical audio data can include at least one piece of audio data of at least one historical user. The process can further include extracting one or more historical voiceprint features from each piece of audio data of the historical user to obtain the plurality of historical voiceprint features before the current moment.

In some embodiments, when the audio data of the historical user is in a stable state, a historical voiceprint feature can be extracted from at least one piece of audio data of the historical user to obtain a historical voiceprint feature corresponding to the historical user. In some other embodiments, when the audio data of the historical user is in an unstable state (for example, intermittent coughing), a plurality of historical voiceprint features can be extracted from at least one piece of audio data of the historical user to obtain the plurality of historical voiceprint features corresponding to the historical user.

For example, if the historical audio data before the current moment includes audio data m1, m2, m3, m4, m5, m6, m7, m8, m9, m10, and m11, m1, m2, m3, m4, m5, m6, m7, m8, m9, m10, and m11 can be arranged in an order of generation time of the audio data from early to late. m1, m2, m3, m4, and m5 can belong to user A, m6, m7, and m8 can belong to historical user B, and m9, m10, and m11 can belong to historical user A. Historical voiceprint features m11, m22, m33, m44, and m55 can be extracted from m1, m2, m3, m4, and m5. Historical voiceprint features m66, m77, and m88 can be extracted from m6, m7, and m8. Historical voiceprint features m99, m100, and m110 can be extracted from m9, m10, and m11.

At S1022, the plurality of historical voiceprint features are clustered to obtain at least one historical cluster. Each historical cluster corresponds to the at least one historical voiceprint feature of the historical user and is associated with the user label of the historical user.

For example, clustering can be performed on m11, m22, m33, m44, m55, m66, m77, m88, m99, m100, and m110 to obtain historical cluster a, historical cluster b, and historical cluster c. Historical cluster a can correspond to historical voiceprint features m11, m22, m33, m44, m99, m100, and m110. Historical cluster b can correspond to historical voiceprint feature m55. Historical cluster c can correspond to historical voiceprint features m66, m77, and m88.

This process can include but is not limited to the following processes.

At S10221, by using each historical voiceprint feature as an original historical cluster, similarity between every two original historical clusters are determined, and two original historical clusters with a highest similarity are merged into one historical cluster to obtain the at least one historical cluster.

At S10222, when the number of the at least one historical cluster does not reach a predetermined number, the process returns to determining the similarities between every two original historical clusters until the number of the at least one historical cluster reaches the predetermined number, and the at least one historical cluster is saved.

The predetermined number can be greater than or equal to a number of users corresponding to the plurality of historical voiceprint features before the current moment.

When the number of the at least one historical cluster reaches the predetermined number, the at least one historical cluster can be saved, which shortens the time to obtain the at least one historical cluster to improve efficiency. The saved at least one historical cluster can be used to improve the efficiency of performing offline clustering on the current voiceprint feature based on the at least one historical cluster.

Different user labels can be associated with different historical clusters and can be used to distinguish different users. The user label associated with each historical voiceprint feature corresponding to the same historical cluster can be the same. For example, historical cluster a can be associated with user label 1, historical cluster b can be associated with user label 2, and historical cluster c can be associated with user label 3. The user labels associated with the historical voiceprint features corresponding to historical clusters a, b, and c can also be output in an order of the generation time of the audio data from early to late, that is, 11112333111.

Although m55, m11, m22, m33, and m44 are all extracted from the audio data of historical user A, in different states, historical user A can cause voiceprint features in audio data m5 to be different from voiceprint features in other audio data. The historical voiceprint features of historical user A can be clustered into two categories. For example, audio data m5 can be the audio data of user A in a coughing state, and audio data m11, m22, m33, and m44 can be the audio data of user A in a normal state. Thus, m55 can be different from m11, m22, m33, and m44.

In some embodiments, the user label can be different from a user identification. At different moments, the user labels associated with the same historical cluster can change. However, user identification does not change over time. For example, the user identification of historical user A can be aa at any time. At the current moment, the user label associated with historical cluster a corresponding to historical user A can be 2, and the user label associated with historical cluster a can be 1 at the moment before the current moment.

At S103, offline clustering is performed on the current voiceprint feature based on the at least one historical cluster to obtain the current cluster. The current cluster is associated with the user label of the user to whom the voiceprint feature corresponding to the current cluster belongs. The current cluster includes at least one cluster corresponding to the current voiceprint features.

In some embodiments, the method can include but is not limited to performing the offline clustering on the current voiceprint feature based on the at least one historical cluster to obtain the current cluster by using a K-means algorithm, or performing the offline clustering on the current voiceprint feature based on the at least one historical cluster using a hierarchical clustering algorithm to obtain the current cluster.

The offline clustering can be performed on the current voiceprint feature based on the at least one historical cluster by using the hierarchical clustering algorithm to obtain the current cluster can include but is not limited to initially determining the current cluster by using the current voiceprint feature as the first target cluster, the initially determined current cluster including the first target cluster and the at least one historical cluster (S1031), and determining the similarities between every two clusters in the initially determined current clusters (S1032).

Determining the similarities between every two clusters in the initially determined current clusters can include obtaining a voiceprint feature corresponding to a first cluster and a voiceprint feature corresponding to a second cluster of each two clusters in the initially determined current cluster (S10321) and calculating a similarity between the voiceprint feature of the first cluster and the voiceprint feature of the second cluster (S10322).

If one voiceprint feature corresponds to the first cluster and one voiceprint feature corresponds to the second cluster, the similarity between the voiceprint feature corresponding to the first cluster and the voiceprint feature corresponding to the second cluster can be directly calculated.

If a plurality of voiceprint features correspond to the first cluster or the second cluster, processing can be first performed on the plurality of voiceprint features corresponding to the first cluster or the plurality of voiceprint features corresponding to the second cluster to obtain a first processing result. The similarity between the plurality of voiceprint features corresponding to the first cluster and the voiceprint feature corresponding to the second cluster can be calculated based on the first processing result, or the similarity between the voiceprint feature corresponding to the first cluster and the plurality of voiceprint features corresponding to the second cluster can be calculated based on the first processing result. In some embodiments, an average voiceprint feature can be obtained by, but is not limited to, performing average calculation processing on the voiceprint features corresponding to the first cluster or the second cluster. Then, the similarity between the average voiceprint feature corresponding to the first cluster and the voiceprint feature corresponding to the second cluster can be calculated, or the similarity between the voiceprint feature corresponding to the first cluster and the average voiceprint feature corresponding to the second cluster can be calculated.

At S1033, whether the highest similarity among similarities between every two clusters is lower than a similarity threshold is determined.

The similarity threshold can be set as needed, which is not limited to the present disclosure.

At S1034, if the highest similarity is lower than the similarity threshold, the clustering is ended to obtain the current cluster.

If the highest similarity of the similarities between every two clusters is lower than the similarity threshold, the similarities between every two clusters can be all lower than the similarity threshold.

At S1035, if the highest similarity is not lower than the similarity threshold, the two clusters corresponding to the highest similarity are merged to obtain a second target cluster.

At S1037, the initially determined current cluster is updated based on the second target cluster, and the method returns to process S1032.

At S104, based on the user labels associated with the historical cluster and the user labels associated with the current cluster, a user label mapping relationship is determined online.

In some embodiments, the offline clustering can be performed on the current voiceprint feature based on the at least one historical cluster. Some voiceprint features of the voiceprint features corresponding to the at least one historical cluster can be clustered in another cluster. When the voiceprint features are clustered into the another cluster and affect the transmission of the user label associated with the historical cluster to change, the user label of the user to which the current voiceprint feature belongs in the current cluster can be affected. For example, if the current voiceprint feature is m120, at least one historical can be historical cluster a, historical cluster b, and historical cluster c introduced in process S102. Based on the at least one historical cluster, the offline clustering can be performed on m120 to obtain the current cluster that includes cluster a and cluster b. Cluster a can correspond to voiceprint features m11, m22, m33, m44, m55, m99, m100, m110, cluster b can correspond to voiceprint features m66, m77, m88, and m120. A user label corresponding to cluster a of the current clusters can be 1, and a user label corresponding to cluster b can be 2. m55 can be changed from corresponding to historical cluster b to corresponding to cluster a. Thus, a user label associated with at least one historical cluster can be changed from 11112333111 to 11111222111, and the user label of the user to whom the current voiceprint feature belongs in the current cluster can be affected to be 2.

To determine the above impact, the user label mapping relationship can be determined online based on the user label associated with the historical cluster and the user label associated with the current cluster.

At S105, based on the user label mapping relationship, the user label of the user to whom the current voiceprint feature belongs in the current cluster is updated online, and the user label of the current voiceprint feature is at least output after the current voiceprint feature is updated.

Based on the user label mapping relationship, the user label of the user to whom the current voiceprint feature belongs can be updated online in the current cluster. Thus, after the current voiceprint feature is updated, the user label of the current voiceprint feature can be used to more accurately represent the cluster corresponding to the current voiceprint feature.

In some embodiments, the to-be-processed audio data can be obtained at the current moment. The current voiceprint feature can be extracted online from the to-be-processed data. The at least one historical cluster at the moment before the current moment can be obtained. The offline clustering can be performed on the current voiceprint feature based on at least one historical cluster to perform the offline clustering on the current voiceprint feature based on the existing cluster. Thus, a cumulative error caused by an initial clustering error can be avoided to improve the clustering accuracy. Meanwhile, the current voiceprint feature can be extracted online. The offline clustering can be performed on the current voiceprint feature to reduce the clustering delay and ensure clustering efficiency.

Figure 3:
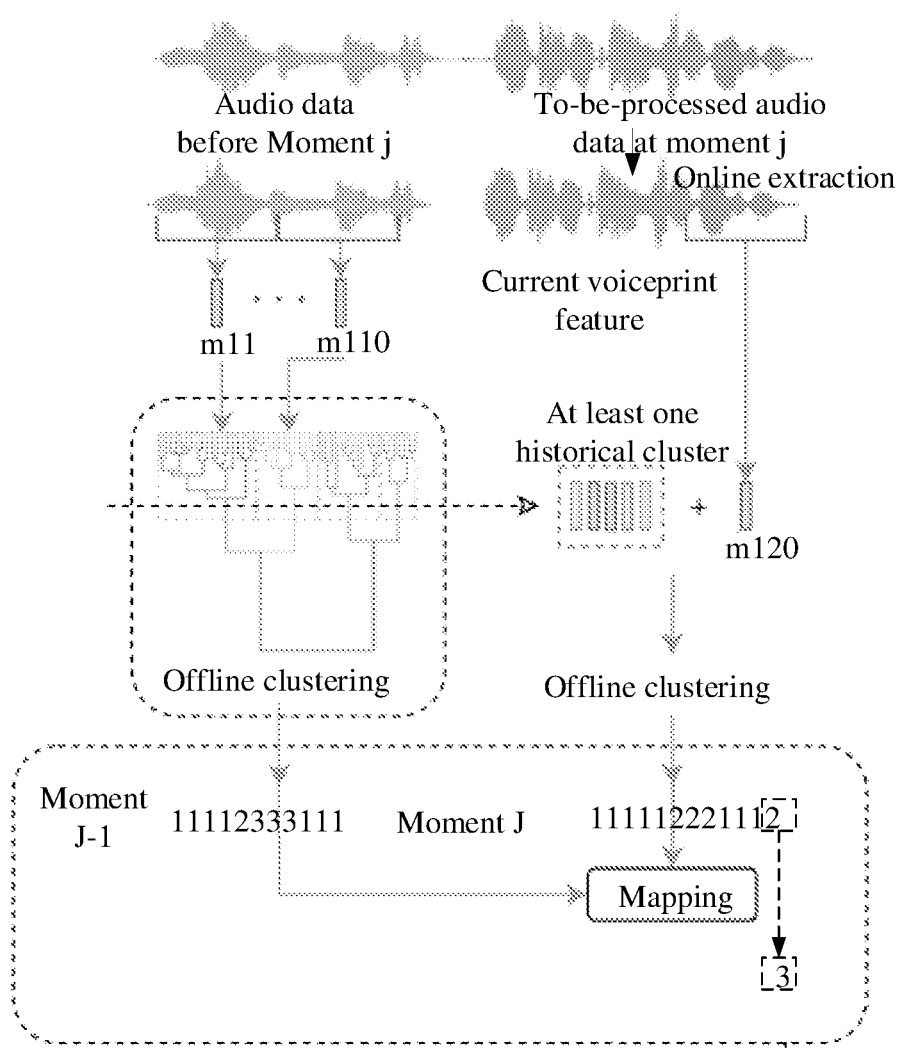
FIG. 3 illustrates a schematic scenario diagram of an audio processing method according to some embodiments of the present disclosure.

Moreover, based on the user label associated with the historical cluster and the user label associated with the current cluster, the user label mapping relationship can be determined online. Based on the user label mapping relationship, the user label of the user to whom the current voiceprint feature belongs can be updated online in the current cluster. Thus, the user label after the current voiceprint feature is updated can correspond to the user label associated with the historical cluster, which can more accurately represent the cluster corresponding to the current voiceprint feature. The user label after the current voiceprint feature is updated can be output to cause the user to accurately determine the user corresponding to the current voiceprint feature to improve the user experience. For example, as shown in FIG. 3, the current moment is represented as moment j, and the moment before the current moment is represented as moment j−1. Based on the user label 11112333111 associated with the historical cluster and the user label 111112221112 associated with the current cluster, the user label mapping relationship can be determined online to be that user label 1 associated with the current cluster corresponds to user label 1 associated with the historical cluster, user label 2 associated with the current cluster corresponds to user label 3 associated with the historical cluster, and user label 3 associated with the current cluster corresponds to user label 2 associated with the historical cluster. Without the user mapping relationship, the user label of the user to whom the current voiceprint feature belongs can be updated online. When the user label of the user to whom the current voiceprint feature belongs is determined to be 2, if the user label 2 corresponds to user label 11112333111 associated with the historical cluster, current voiceprint features m120 and m55 can be incorrectly determined to correspond to a same category. However, based on the user label mapping relationship. User label 2 of the user to whom m120 belongs can be updated online in user label 111112221112 associated with the current cluster. The user label of m120 after being updated can be obtained as 3. If user label 3 corresponds to user label 11112333111 associated with the historical cluster, m120 and m66, m77, and m88 can correspond to the same cluster, which can more accurately represent the cluster corresponding to the current voiceprint feature.

Figure 4:
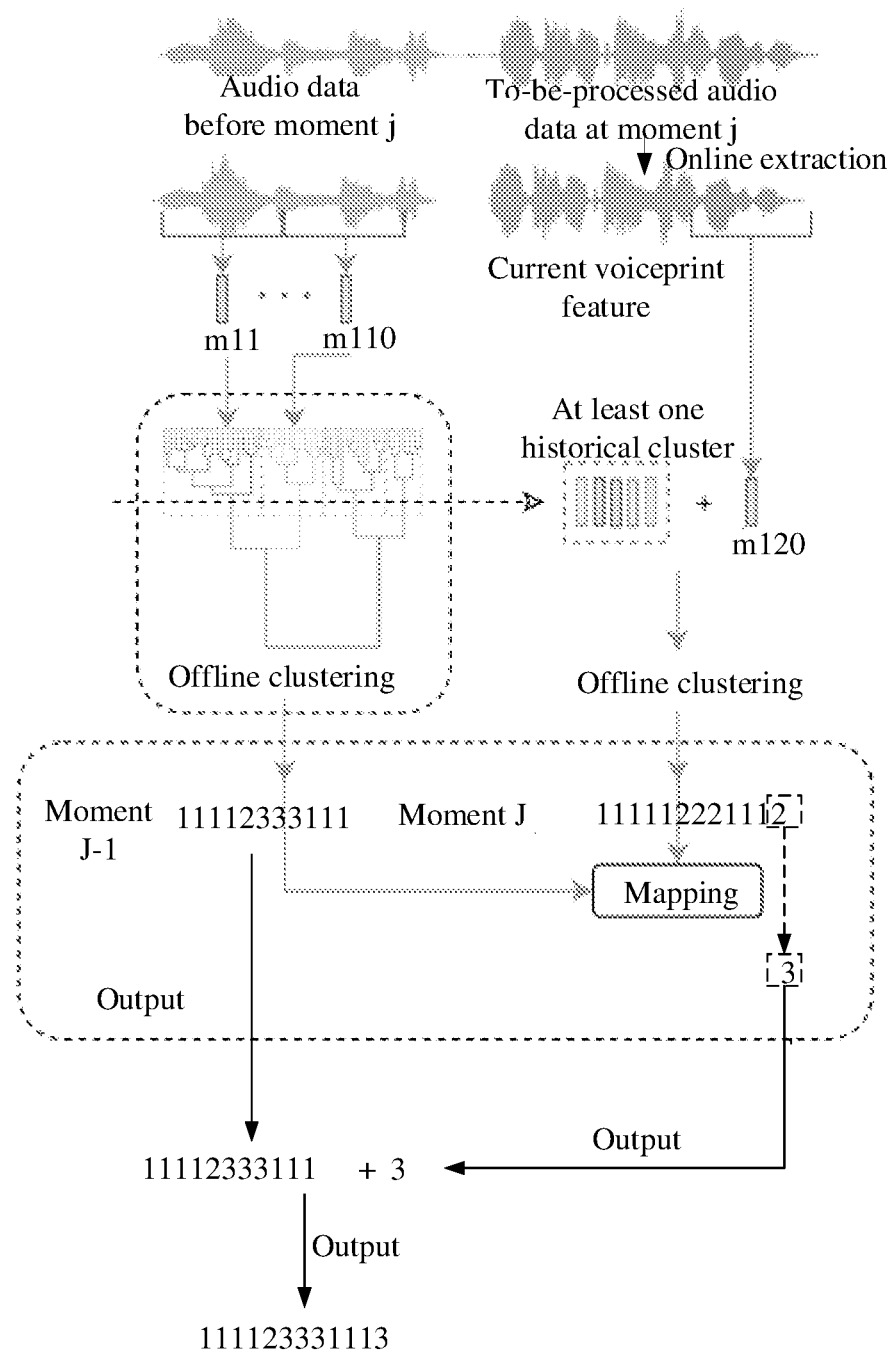
FIG. 4 illustrates another schematic scenario diagram of an audio processing method according to some embodiments of the present disclosure.

For example, as shown in FIG. 4, at least updated user label 3 of the current voiceprint feature m120 is output.

Figure 5:
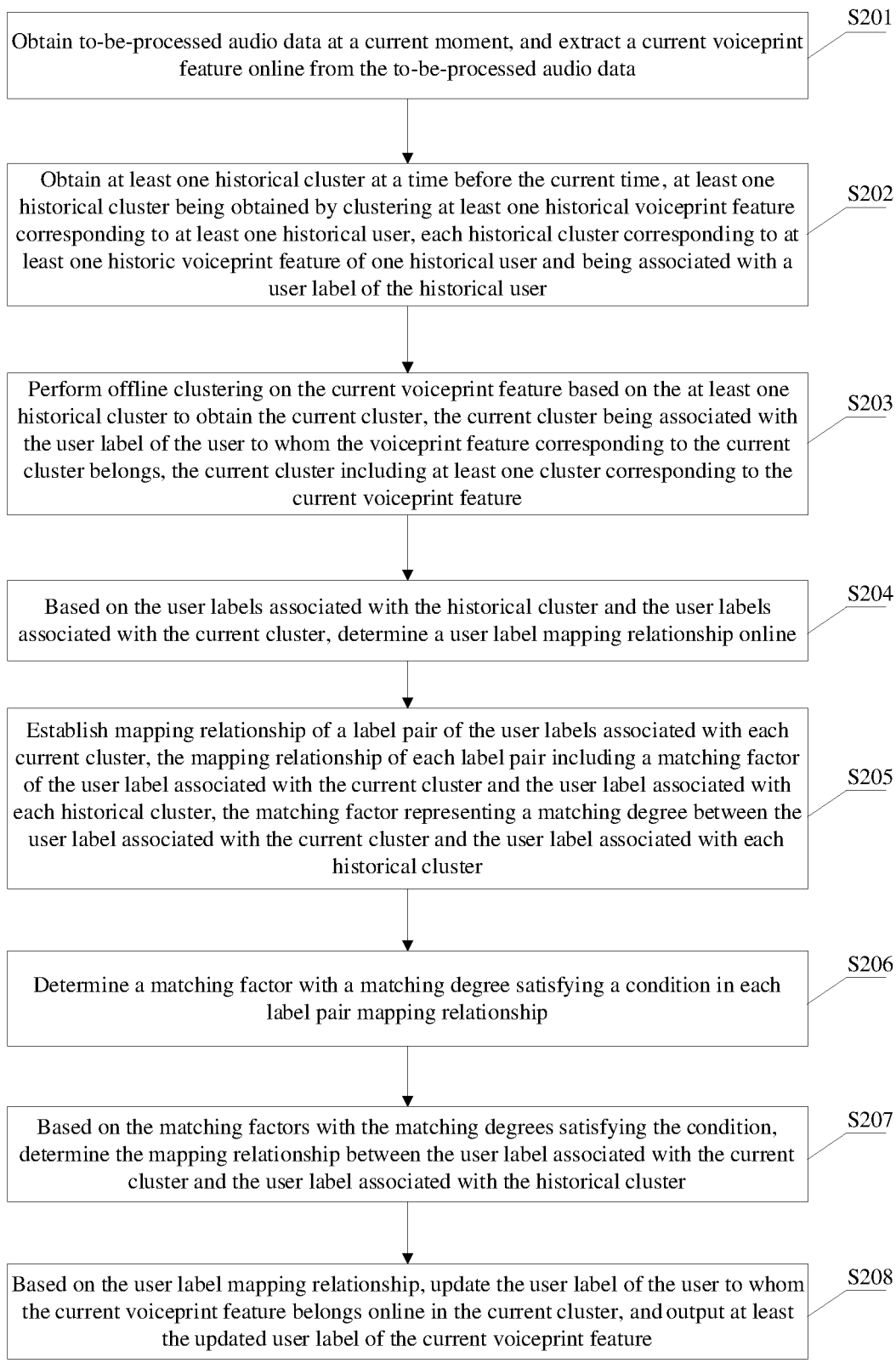
FIG. 5 illustrates a schematic flowchart of an audio processing method according to some embodiments of the present disclosure.

In embodiments of the present disclosure, FIG. 5 illustrates a schematic flowchart of an audio processing method according to some embodiments of the present disclosure. In embodiments of the present disclosure, the above audio processing method can be detailed. As shown in FIG. 5, the method can include but is not limited to the following processes.

At S201, the to-be-processed audio data is obtained at the current moment, and the current voiceprint feature is extracted online from the to-be-processed audio data.

At S202, the at least one historical cluster at the moment before the current moment is obtained. The at least one historical cluster is obtained by clustering the at least one historical voiceprint feature corresponding to the at least one historical user. Each historical cluster corresponds to at least one historical voiceprint feature of a historical user and is associated with the user label of the historical user.

At S203, the offline clustering is performed on the current voiceprint feature based on the at least one historical cluster to obtain the current cluster. The current cluster is associated with the user label of the user to whom the voiceprint feature corresponding to the current cluster belongs. The current cluster includes at least one cluster corresponding to the current voiceprint feature.

For the detailed process of processes S201 to S203, reference can be made to the relevant introduction of processes S101 to S103 above, which is not repeated here.

At S204, the user label associated with the current cluster and the at least one user label associated with the at least one historical cluster are obtained.

At S205, a label pair mapping relationship of the user labels associated with each current cluster is established. Each label pair mapping relationship includes a matching factor of the user label associated with the current cluster and the user label associated with each historical cluster. The matching factor represents a matching degree between the user label associated with the current cluster and the user label associated with each historical cluster.

In some embodiments, the method includes, but is not limited to, performing a comparison on the user label associated with the current cluster and the user label associated with each historical cluster to obtain the mapping relationship of the label pair of the user label associated with the current cluster.

When the comparison is performed on the user label associated with the current cluster and the user label associated with each historical cluster, if the number of the current clusters is small than the number of the historical clusters, n virtual current clusters can be established based on the current cluster and a difference between the number of the current clusters and the number of the historical clusters. n can be equal to the difference between the number of the current clusters and the number of the historical clusters, and the virtual current cluster can be different from the current cluster. The virtual current cluster can correspond to one or more virtual voiceprint features.

Performing the comparison in pairs on the user label associated with the current cluster and the user label associated with each historical cluster can include performing the comparison in pairs on the user label associated with the voiceprint feature corresponding to the current cluster and the user label associated with the historical voiceprint feature corresponding to each historical cluster.

Corresponding to the method of performing the comparison in pairs on the user label associated with the current cluster and the user label associated with each historical cluster, the matching factor of the user label associated with the current cluster and the user label associated with each historical cluster can be a number of the user labels associated with the historical voiceprint features corresponding to the historical cluster mapped to the user labels associated with the voiceprint features of the current cluster.

For example, with reference to the current cluster above, that is, cluster a and cluster b. The user label associated with cluster a and cluster b can be 111112221112. The comparison in pairs can be performed on user label 1 associated with cluster a and historical cluster a, user label 2 associated with historical cluster b, and user label 3 associated with historical cluster c to obtain the label pair mapping relationship shown in Table 1.

As shown in Table 1, 7, 1, and 0 belong to label pair mapping relationship 1 (i.e., the label pair mapping relationship of user label 1 associated with cluster a). 7 in label pair mapping relationship 1 can represent the number of user labels 1111111 associated with the voiceprint features corresponding to historical cluster a matching user label 1111111 associated with the voiceprint features corresponding to cluster a. 1 can represent the number of user label 2 associated with the voiceprint features corresponding to the historical cluster a matching user label 11111111 associated with the voiceprint features corresponding to cluster a. 0 can represent the number of user labels 3 associated with the voiceprint features corresponding to historical cluster a matching user label 11111111 associated with the voiceprint features corresponding to cluster a.

0, 0, and 3 can belong to label pair mapping relationship 2 (i.e., the label pair mapping relationship of user label 2 associated with cluster b). The first 0 in label pair mapping relationship 2 can represent the number of user labels 1 associated with the voiceprint features corresponding to historical cluster a matching user label 2222 associated with the voiceprint features corresponding to cluster b. The second 0 can represent the number of user labels 2 associated with the voiceprint features corresponding to historical cluster a matching user label 2222 associated with the voiceprint features corresponding to cluster b. 3 can represent the number of user labels 3 associated with the voiceprint features of historical cluster a matching user label 2222 associated with the voiceprint features corresponding to cluster b.

0, 0, 0 belongs to label pair mapping relationship 3 (i.e., the label pair mapping relationship of user label 3 associated with the virtual current cluster). The first 0 in label pair mapping relationship 3 can represent the number of user labels 1 associated with the voiceprint features corresponding to historical cluster a matching user label 3 associated with the voiceprint features corresponding to the virtual current cluster. The second 0 can represent the number of user labels 2 associated with the voiceprint features corresponding to historical cluster a matching user label 3 associated with the voiceprint features corresponding to the virtual current cluster. The third 0 can represent the number of user labels 3 associated with the voiceprint features corresponding to historical cluster a matching user label 3 associated with the voiceprint features corresponding to the virtual current cluster.

| Label pair mapping relationship 1 | Label pair mapping relationship 2 | Label pair mapping relationship 3 |
|---|---|---|
| 7 | 0 | 0 |
| 1 | 0 | 0 |
| 0 | 3 | 0 |

At S206, a matching factor with a matching degree satisfying a condition is determined in each label pair mapping relationship.

The process can include obtaining N groups of matching factors based on label pair mapping relationships, each group of matching factors includes one matching factor of the label pair mapping relationships, and N is smaller than the number of the user labels associated with the historical cluster (S2061).

In some embodiments, each group of matching factors can include one matching factor of the matching factors in the label pair mapping relationships. The user label associated with the current cluster and the user label associated with the historical cluster to which each matching factor of the group of matching factors belongs can be different.

For example, as shown in Table 1, based on label pair mapping relationships 1, 2, and 3, two groups of matching factors can be obtained. A first group of matching factors can include 7 in label pair mapping relationship 1, 3 in label pair mapping relationship 2, and 0 in label pair mapping relationship 3. A second group of matching factors can include 1 in label pair mapping relationship 1, 3 in label pair mapping relationship 2, and the first 0 in label pair mapping relationship 3.

At S2062, a group of matching factors with a largest sum of the matching factors from the groups of matching factors is determined as the matching factors in the label pair mapping relationships with the matching degrees satisfying the condition.

For example, in process S2061, the sum of the matching factors in the first group of matching factors can be 10, and the sum of the matching factors in the second group of matching factors can be 4. Then, the first group of matching factors can be determined as the matching factors in the label pair mapping relationships with the matching degrees satisfying the condition.

At S207, based on the matching factors with the matching degrees satisfying the condition, the mapping relationship between the user label associated with the current cluster and the user label associated with the historical cluster is determined.

In some embodiments, the user label associated with the current cluster and the user label associated with the historical cluster to which the matching factors with matching degrees satisfying the condition belong can be determined. The user label associated with the current cluster and the user label associated with the historical cluster to which the matching factors with the matching degrees satisfying the condition belong can be determined to have a one-to-one mapping relationship.

For example, based on the matching factors in the first group of matching factors, user label 1 associated with cluster a in the current cluster to which matching factor 7 of the first group of matching factors belongs and user label 1 associated with the historical cluster can be determined to have a one-to-one mapping relationship. User label 2 associated with cluster b of the current cluster to which matching factor 3 in the first group of matching factors belongs and user label 3 associated with the historical cluster can be determined to have a one-to-one mapping relationship. User label 3 associated with the virtual current cluster of the current cluster to which matching factor 0 of the first group of matching factors belongs and user label 2 associated with the historical cluster can be determined to have a one-to-one mapping relationship.

Processes S204 to S207 are a specific implementation manner of process S104 above.

At S208, based on the user label mapping relationship, the user label of the user to whom the current voiceprint feature belongs is updated online in the current cluster, and the updated user label of the current voiceprint feature is at least output.

For a detailed process of process S208, reference can be made to a specific implementation manner of process S105 above.

In some embodiments, the to-be-processed audio data at the current moment can be obtained. The at least historical cluster at the moment before the current moment can be obtained. The offline clustering can be performed on the current voiceprint feature based on the at least one historical cluster to perform the offline clustering on the current voiceprint feature based on the existing cluster. Therefore, the cumulative error caused by the initial clustering error can be avoided, and the clustering accuracy can be improved. Meanwhile, by extracting the current voiceprint feature online and performing the offline clustering on the current voiceprint feature, the clustering delay can be reduced, and the clustering efficiency can be ensured.

Moreover, by obtaining the user label associated with the current cluster and at least one user label associated with at least one historical cluster, the label pair mapping relationship of the user labels associated with each current cluster can be established. Each label pair mapping relationship can include the user label associated with the current cluster and the matching factor of the user label associated with each historical cluster. The matching factor can represent a matching degree between the user label associated with the current cluster and the user label associated with each historical cluster. The matching factor with the matching degree satisfying the condition can be determined in the label pair mapping relationship. Based on the matching factor with the matching degree satisfying the condition, the mapping relationship between the user label associated with the current cluster and the user label associated with the historical cluster can be determined. Based on the user label mapping relationship, the user label of the user to whom the current voiceprint feature belongs can be updated online in the current cluster. Thus, the updated user label of the current voiceprint feature can correspond to the user label associated with the historical cluster to more accurately represent the cluster corresponding to the current voiceprint feature and output the updated user label of the current voiceprint feature. Therefore, the user can accurately determine the user label corresponding to the current voiceprint feature to improve the user experience.

Figure 6:
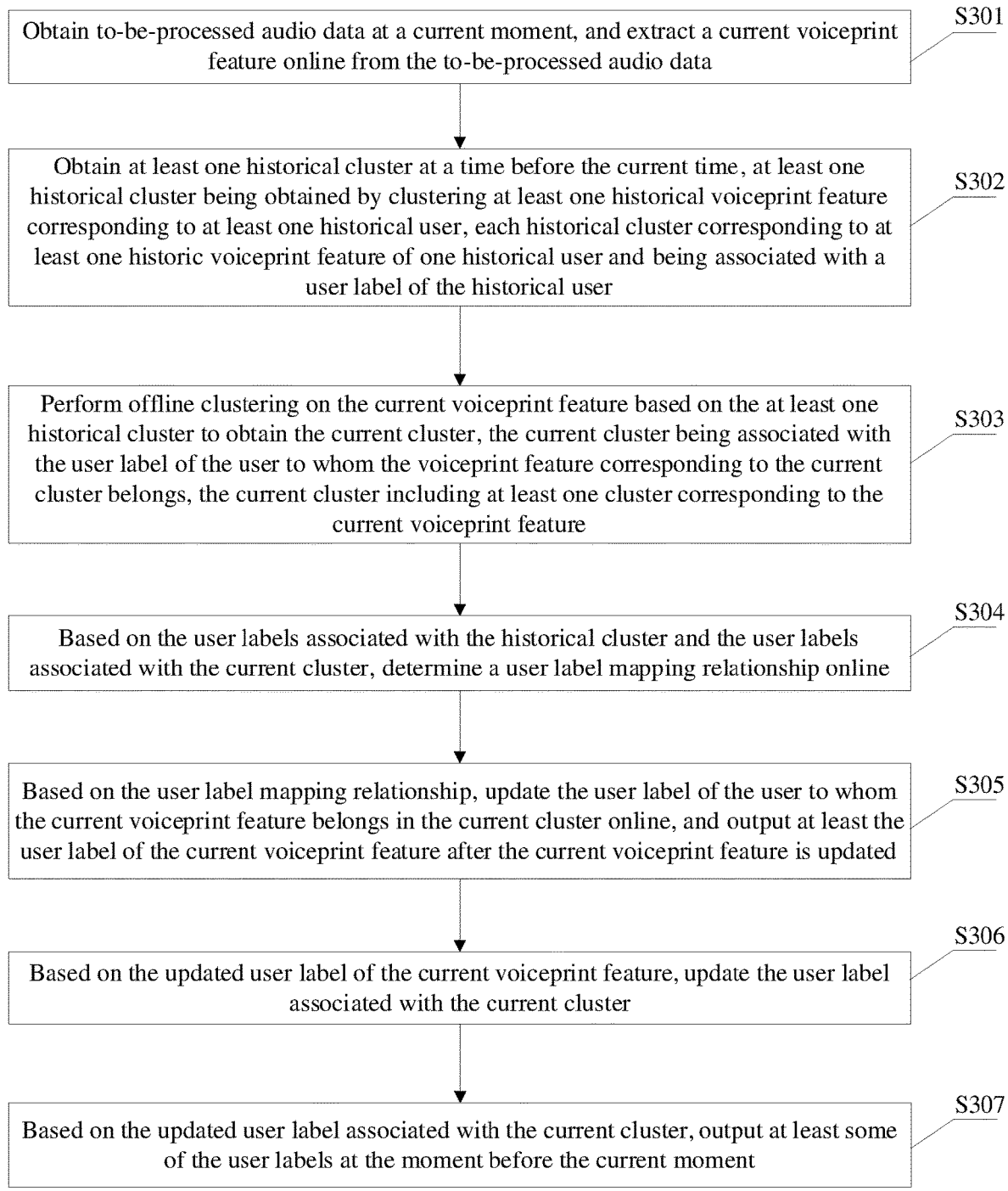
FIG. 6 illustrates a schematic flowchart of an audio processing method according to some embodiments of the present disclosure.

In some embodiments of the present disclosure, FIG. 6 illustrates a schematic flowchart of an audio processing method according to some embodiments of the present disclosure. In some embodiments, an extension solution for the above audio processing method is described. As shown in FIG. 6, the method includes but is not limited to the following processes.

At S301, the to-be-processed audio data at the current moment is obtained, and the current voiceprint feature is extracted online from the to-be-processed audio data.

At S302, the at least one historical cluster at the moment before the current moment is obtained. The at least one historical cluster is obtained by clustering the at least one historical voiceprint feature corresponding to the at least one historical user. Each historical cluster corresponds to the at least one historical voiceprint feature of the historical user and is associated with the user label of the historical user.

At S303, the offline clustering is performed on the current voiceprint feature based on the at least one historical cluster to obtain the current cluster. The current cluster is associated with the user label of the user to whom the voiceprint feature corresponding to the current cluster belongs. The current cluster includes at least one cluster corresponding to the current voiceprint feature.

At S304, based on the user label associated with the historical cluster and the user label associated with the current cluster, the user label mapping relationship is determined online.

At S305, based on the user label mapping relationship, the user label of the user to whom the current voiceprint feature belongs is updated online in the current cluster, and the updated user label of the current voiceprint feature is output.

For a detailed process of processes S301 to S305, reference can be made to the relevant introduction of processes S101 to S105, which are not repeated here.

At S306, based on the updated user label of the current voiceprint feature, the user label associated with the current cluster is updated.

Figure 7:
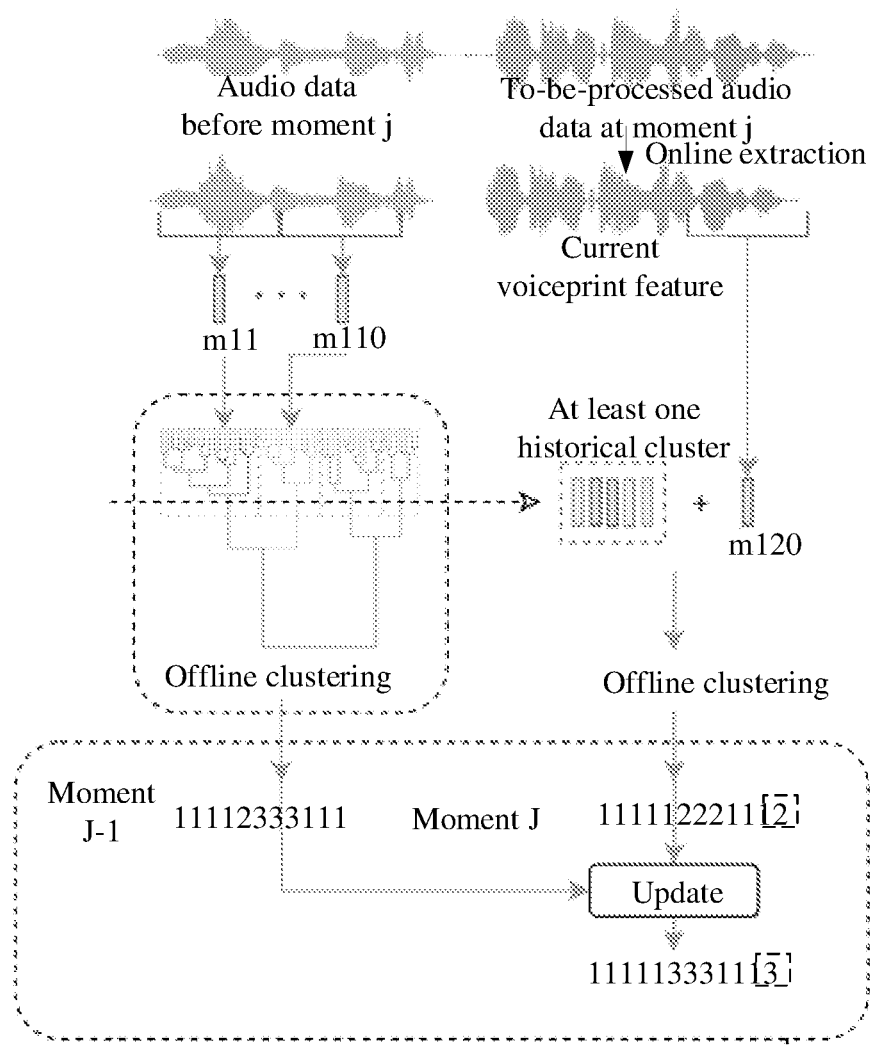
FIG. 7 illustrates a schematic scenario diagram of an audio processing method according to some embodiments of the present disclosure.

In some embodiments, based on the updated user label of the current voiceprint feature and the user label mapping relationship, the user label associated with the current cluster can be updated. For example, based on the example above, as shown in FIG. 7, the updated user label of m120 is obtained to be 3, and the user label mapping relationship is obtained. User label 111112221112 associated with the current cluster can be updated to 111113331113.

At S307, based on the updated user label associated with the current cluster, at least some of the user labels output at the moment before the current moment.

Figure 8:
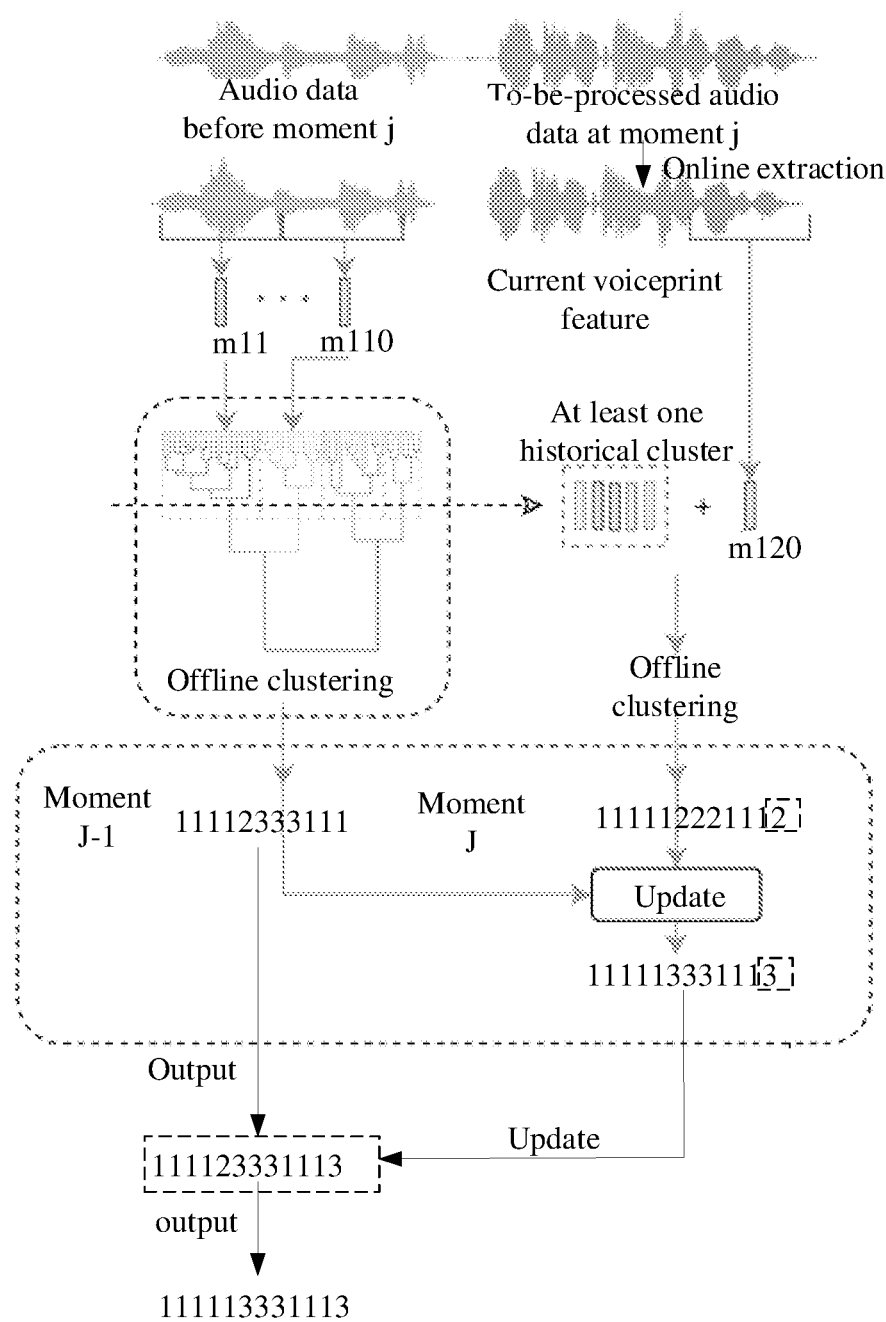
FIG. 8 illustrates another schematic scenario diagram of an audio processing method according to some embodiments of the present disclosure.

In some embodiments, based on the updated user label associated with the current cluster, some user labels output at the moment before the current moment can be updated. Based on the updated user label associated with the current cluster, all the user labels output at the moment before the current moment can be updated. As shown in FIG. 8, based on updated user label 111113331113 associated with the current cluster, all the user labels output at the moment before the current moment are updated, and 1111113331113 is output.

In some embodiments, the to-be-processed audio data at the current moment can be obtained. The current voiceprint feature can be extracted online from the to-be-processed audio data. The at least one historical cluster at the moment before the current moment can be obtained. The offline clustering can be performed on the current voiceprint feature based on at least one historic cluster to perform the offline clustering on the current voiceprint feature based on the existing cluster. Thus, the cumulative error caused by the initial clustering error can be avoided, and the clustering accuracy can be improved. Meanwhile, by extracting the current voiceprint feature online and performing the offline clustering on the current voiceprint feature, the clustering delay can be reduced, and the clustering efficiency can be ensured.

Moreover, based on the user label associated with the historical cluster and the user label associated with the current cluster, the user label mapping relationship can be determined online. Based on the user label mapping relationship, the user label of the user to whom the current voiceprint feature belongs can be updated online in the current cluster. Thus, the updated user label of the current voiceprint feature can correspond to the user label associated with the historical cluster, which can accurately represent the cluster corresponding to the current voiceprint feature. The updated user label of the current voiceprint feature can be output. Thus, the user can accurately determine the user corresponding to the current voiceprint feature, and the user experience can be improved.

Moreover, based on the updated user label of the current voiceprint feature, the user label associated with the current cluster can be updated. Based on the updated user label associated with the current cluster, at least some of the user labels output at the moment before the current moment can be updated to update the historically outputted user label.

Corresponding to the above audio processing method provided of embodiments of the present disclosure, the present disclosure further provides an audio processing device.

Figure 9:
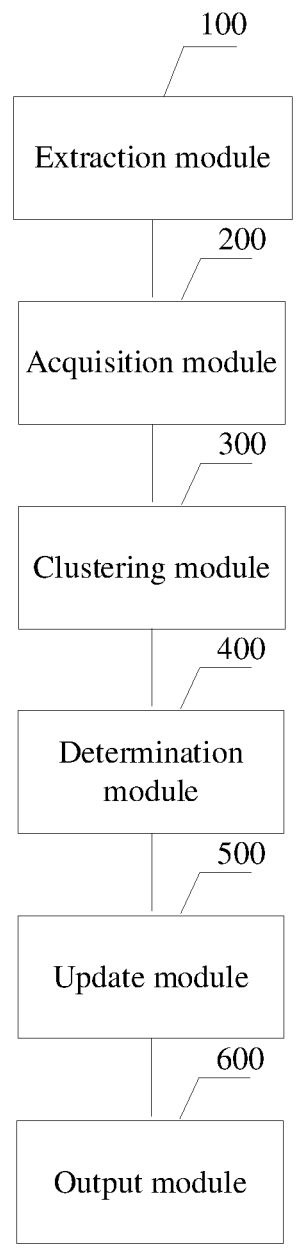
FIG. 9 illustrates a schematic structural diagram of an audio processing device according to some embodiments of the present disclosure.

In some embodiments, as shown in FIG. 9, the audio processing device includes an extraction module 100, an acquisition module 200, a clustering module 300, a determination module 400, an update module 500, and an output module 600.

The extraction module 100 can be configured to obtain the to-be-processed audio data at the current moment and extract the current voiceprint feature online from the to-be-processed audio data.

The acquisition module 200 can be configured to obtain the at least one historical cluster at the moment before the current moment. The at least one historical cluster can be obtained by clustering the at least one historical voiceprint feature corresponding to the at least one historical user. Each historical cluster can correspond to at least one historical voiceprint feature of the historical user and can be associated with the user label of the historical user.

The clustering module 300 can be configured to perform the offline clustering on the current voiceprint feature based on the at least one historical cluster to obtain the current cluster. The current cluster can be associated with the user label of the user to whom the voiceprint feature corresponding to the current cluster belongs. The current cluster can include at least one cluster corresponding to the current voiceprint feature.

The determination module 400 can be configured to determine the user label mapping relationship online based on the user labels associated with the historical cluster and the user labels associated with the current cluster.

The update module 500 can be configured to update the user label of the user to whom the current voiceprint feature belongs online in the current cluster based on the user label mapping relationship.

The output module 600 can be configured to at least output the updated user label of the current voiceprint feature.

In some embodiments, the determination module 400 can be configured to:
 obtain the user label associated with the current cluster and the at least one user label associated with the at least one historical cluster;
 establish the label pair mapping relationship of the user label associated with each current cluster, each label pair mapping relationship including the user label associated with the current cluster and the matching factor of the user label associated with each historical cluster, and the matching factor representing the matching degree between the user label associated with the current cluster and the user label associated with each historical cluster;
 determine the matching factor with the matching degree satisfying the condition in the label pair mapping relationships; and
 based on the matching factor with the matching degree satisfying the condition, determine the mapping relationship between the user label associated with the current cluster and the user label associated with the historical cluster.

In some embodiments, each label pair mapping relationship can be obtained by performing a comparison in pairs on the user label associated with the current cluster and the user label associated with each historical cluster.

In some embodiments, the determination module 400 can be configured to, based on each label pair mapping relationship, obtain N groups of matching factors. Each group of matching factors includes one matching factor in the label pair mapping relationship, and N is less than the number of the user labels associated with the historical cluster. The determination module 400 can be further configured to determine the group of matching factors with the largest sum of the matching factors in the plurality of groups of matching factors as the matching factor with the matching degree satisfying the condition in the label pair mapping relationships.

In some embodiments, the audio processing device can also include an output update module.

The output update module can be configured to, based on the updated user label of the current voiceprint feature, update the user label associated with the current cluster, and based on the updated user label associated with the current cluster, update at least some user labels output at the moment before the current moment.

In some embodiments, the audio processing device can also include a historical cluster determination module.

The historical cluster determination module can be configured to obtain the plurality of historical voiceprint features before the current moment, determine the similarity between each two original historical clusters by using each historical voiceprint feature as an original historical cluster, merge two original historical clusters with the highest similarity into one historical cluster to obtain the at least one historical cluster, when the number of the at least one historical cluster does not reach the predetermined number, return to determining the similarity between each two original historical clusters until the number of the at least one historical cluster reaches the predetermined number, and save the at least one historical cluster;

The predetermined number can be greater than or equal to the number of users corresponding to the plurality of historical voiceprint features before the current moment.

In some embodiments, the clustering module 300 can be configured to:
- determine the current cluster using the current voiceprint feature as the first target cluster, the initially determined current cluster including the first target cluster and the at least one historical cluster;
- determine the similarities between every two clusters in the initially determined current cluster;
- determine whether the highest similarity among the similarities between every two clusters is below the similarity threshold;
- if the highest similarity is lower than the similarity threshold, end the clustering and obtain the current cluster;
- if the highest similarity is not lower than the similarity threshold, merge the two clusters corresponding to the highest similarity to obtain the second target cluster; and
- update the initially determined current cluster based on the second target cluster, and return to the process of determining the similarities between every two clusters in the initially determined current cluster.

Corresponding to the above audio processing method of embodiments of the present disclosure, the present disclosure further provides an electronic apparatus, which applies the audio processing method.

The electronic apparatus can include a memory 10 and a processor 20.

The memory 10 can be used to store at least an instruction set.

The processor 20 can be configured to call and execute the instruction set in the memory 10 to execute the audio processing method described above.

Corresponding to the above audio processing method of embodiments of the present disclosure, the present disclosure further provides a storage medium.

In some embodiments, the storage medium can be used to store a computer program implementing the audio processing method described above. The computer program can be executed by the processor to cause the processor to implement the audio processing method described above.

Each embodiment focuses on the difference from other embodiments. The same and similar parts of various embodiments can be referred to each other. Since device embodiments are basically similar to method embodiments, the description is relatively simple. For related parts, reference can be made to the description of the method embodiments.

In this specification, relational terms such as first and second are only used to distinguish one entity or operation from another and do not necessarily require or imply that these entities or operations have any such actual relationship or sequence. Furthermore, the term "comprising," "including," or any other variation thereof is intended to cover a non-exclusive inclusion such that a process, method, article, or apparatus including a set of elements includes not only those elements, but also includes other elements not expressly listed or elements inherent in such a process, method, article, or apparatus. Without further limitations, an element defined by the phrase "comprising a . . . " does not exclude the presence of additional identical elements in the process, method, article, or apparatus including the elements.

To facilitate the description, when the above device is described, functions are divided into various units and described separately. In some embodiments, the functions of the units can be implemented in one or more pieces of software and/or hardware.

From the above description of embodiments of the present disclosure, those skilled in the art can understand that the present disclosure can be implemented by software plus a necessary general-purpose hardware platform. Based on this understanding, the essence of the technical solution of the present disclosure or the part that contributes to the existing technology can be embodied in a software product. The computer software product can be stored in storage media, such as ROM/RAM, magnetic disk, CD, etc., including several instructions to make a computer apparatus (e.g., a personal computer, a server, or a network apparatus, etc.) execute the methods described above.

The audio processing method, device, electronic apparatus, and storage medium of the present disclosure have been described above in detail. Specific examples are used to illustrate the principles and implementation methods of the present disclosure. The above description is only used to help understand the method and core idea of the present disclosure. Meanwhile, for those of ordinary skill in the art, according to the idea of the present disclosure, changes can be made to embodiments and application ranges of the present disclosure. In summary, the content of this specification should not be construed as a limitation of the present disclosure.

What is claimed is:

1. An audio processing method, comprising:
    obtaining, at a current moment, to-be-processed audio data comprising a stream of digital audio samples, and extracting, at a processor, in real time using a voiceprint recognition model, a current voiceprint feature online from the to-be-processed audio data, the extracting comprising deleting noise data from the to-be-processed audio data to obtain target data and determining the current voiceprint feature from the target data;
    obtaining, from a memory, at least one historical cluster at a moment before the current moment, the at least one historical cluster being obtained by clustering at least one historical voiceprint feature corresponding to at least one historical user, and each historical cluster corresponding to at least one historical voiceprint feature of one historical user and being associated with a user label of the historical user;
    performing offline clustering on the current voiceprint feature based on the at least one historical cluster to obtain a current cluster, the current cluster being associated with a user label of a user to whom the voiceprint feature corresponding to the current cluster belongs, the current cluster including at least one cluster corresponding to the current voiceprint feature;
    based on the user label associated with the historical cluster and the user label associated with the current cluster, determining a user label mapping relationship online; and
    based on the user label mapping relationship, updating the user label of the user to whom the current voiceprint feature belongs online in the current cluster, and outputting an updated user label of the current voiceprint feature, such that audio data of a same user from continuous multi-user audio data is clustered into a same category.

2. The method according to claim 1, wherein based on the user label associated with the historical cluster and the user label associated with the current cluster, determining the user label mapping relationship online includes:
   obtaining the user label associated with the current cluster and the at least one user label associated with the at least one historical cluster;
   establishing a label pair mapping relationship for each user label associated with the current cluster, each label pair mapping relationship including a matching factor between the user label associated with the current cluster and a user label associated with each historical cluster, the matching factor representing a matching degree between the user label associated with the current cluster and the user label associated with each historical cluster;
   determining a matching factor with a matching degree satisfying a condition in each label pair mapping relationship; and
   based on the matching factor with the matching degree satisfying the condition, determining a mapping relationship between the user label associated with the current cluster and the user label associated with the historical cluster.

3. The method according to claim 2, wherein:
   each label pair mapping relationship is obtained by performing comparison in pairs on the user label associated with the current cluster and the user label associated with each historical cluster; and
   determining the matching factor with the matching degree satisfying the condition in the label pair mapping relationship includes:
      based on the label pair mapping relationship, obtaining N groups of matching factors, each group of matching factors including a matching factor of the label pair mapping relationship, N being smaller than a number of user labels of the historical cluster; and
      determining a group of matching factors with a largest sum of matching factors in a plurality of groups of matching factors as the matching factor with the matching degree satisfying the condition of the label pair mapping relationship.

4. The method according to claim 1, further comprising:
   based on the updated user label of the current voiceprint feature, updating the user label associated with the current cluster; and
   based on the updated user label associated with the current cluster, updating at least some user labels output at the moment before the current moment.

5. The method of claim 1, wherein determining the at least one historical cluster includes:
   obtaining a plurality of historical voiceprint features before the current moment;
   by using each historical voiceprint feature as an original historical cluster, determining similarities between every two original historical clusters, and merging two original historical clusters with a highest similarity into one historical cluster to obtain at least one historical cluster;
   in response to a number of the at least one historical cluster not reaching a predetermined number, returning to determining the similarities between every two original historical clusters until the number of the at least one historical cluster reaching the predetermined number, and saving the at least one historical cluster;
   wherein, the predetermined number is greater than or equal to a number of users corresponding to the plurality of historical voiceprint features before the current moment.

6. The method according to claim 1, wherein performing the offline clustering on the current voiceprint feature based on the at least one historical cluster to obtain the current cluster includes:
   determining initially a current cluster using the current voiceprint feature as a first target cluster, the initially determined current cluster including the first target cluster and the at least one historical cluster;
   determining similarities between every two clusters in the initially determined current cluster;
   determining whether a highest similarity among similarities between every two clusters is lower than a similarity threshold;
   in response to the highest similarity being lower than the similarity threshold, ending clustering, and obtaining the current cluster;
   in response to the highest similarity being not lower than the similarity threshold, merging the two clusters corresponding to the highest similarity to obtain a second target cluster; and
   updating the initially determined current cluster based on the second target cluster, and returning to determining the similarities between every two clusters in the initially determined current cluster.

7. A non-transitory computer-readable storage medium storing instructions which, when executed by a processor, cause the processor to perform a method comprising:
   obtaining, at a current moment, to-be-processed audio data comprising a stream of digital audio samples, and extract, in real time using a voiceprint recognition model, a current voiceprint feature online from the to-be-processed audio data, the extracting comprising deleting noise data from the to-be-processed audio data to obtain target data and determining the current voiceprint feature from the target data;
   obtaining, from a memory, at least one historical cluster at a moment before the current time, the at least one historical cluster being obtained by clustering at least one historical voiceprint feature corresponding to at least one historical user, and each historical cluster corresponding to at least one historical voiceprint feature of one historical user and being associated with a user label of the historical user;
   performing offline clustering on the current voiceprint feature based on the at least one historical cluster to obtain a current cluster, the current cluster being associated with a user label of a user to whom the voiceprint feature corresponding to the current cluster belongs, the current cluster including at least one cluster corresponding to the current voiceprint feature;
   based on the user label associated with the historical cluster and the user label associated with the current cluster, determining a user label mapping relationship online;
   based on the user label mapping relationship, updating the user label of the user to whom the current voiceprint feature belongs online in the current cluster; and
   at least outputting the updated user label of the current voiceprint feature, such that audio data of a same user from continuous multi-user audio data is clustered into a same category.

8. The non-transitory computer-readable storage medium according to claim 7, wherein based on the user label associated with the historical cluster and the user label associated with the current cluster, the determining the user label mapping relationship online further comprises:
  obtaining the user label associated with the current cluster and the at least one user label associated with the at least one historical cluster;
  establishing a label pair mapping relationship for each user label associated with the current cluster, each label pair mapping relationship including a matching factor between the user label associated with the current cluster and a user label associated with each historical cluster, the matching factor representing a matching degree between the user label associated with the current cluster and the user label associated with each historical cluster;
  determining a matching factor with a matching degree satisfying a condition in each label pair mapping relationship; and
  based on the matching factor with the matching degree satisfying the condition, determining a mapping relationship between the user label associated with the current cluster and the user label associated with the historical cluster.

9. The non-transitory computer-readable storage medium according to claim 8, wherein:
  each label pair mapping relationship is obtained by performing comparison in pairs on the user label associated with the current cluster and the user label associated with each historical cluster; and
  the determining the matching factor with the matching degree satisfying the condition in the label pair mapping relationship further comprises:
    based on the label pair mapping relationship, obtaining N groups of matching factors, each group of matching factors including a matching factor of the label pair mapping relationship, N being smaller than a number of user labels of the historical cluster; and
    determining a group of matching factors with a largest sum of matching factors in a plurality of groups of matching factors as the matching factor with the matching degree satisfying the condition of the label pair mapping relationship.

10. The non-transitory computer-readable storage medium according to claim 7, wherein the method further comprises:
  based on the updated user label of the current voiceprint feature, updating the user label associated with the current cluster; and
  based on the updated user label associated with the current cluster, updating at least some user labels output at the moment before the current moment.

11. The non-transitory computer-readable storage medium according to claim 7, wherein the determining the at least one historical cluster further comprises:
  obtaining a plurality of historical voiceprint features before the current moment;
  by using each historical voiceprint feature as an original historical cluster, determining similarities between every two original historical clusters, and merging two original historical clusters with a highest similarity into one historical cluster to obtain at least one historical cluster;
  in response to a number of the at least one historical cluster not reaching a predetermined number, returning to determining the similarities between every two original historical clusters until the number of the at least one historical cluster reaching the predetermined number, and saving the at least one historical cluster;
  wherein, the predetermined number is greater than or equal to a number of users corresponding to the plurality of historical voiceprint features before the current moment.

12. The non-transitory computer-readable storage medium according to claim 7, wherein the performing the offline clustering on the current voiceprint feature based on the at least one historical cluster to obtain the current cluster further comprises:
  determining initially a current cluster using the current voiceprint feature as a first target cluster, the initially determined current cluster including the first target cluster and the at least one historical cluster;
  determining similarities between every two clusters in the initially determined current cluster;
  determining whether a highest similarity among similarities between every two clusters is lower than a similarity threshold;
  in response to the highest similarity being lower than the similarity threshold, ending clustering, and obtaining the current cluster;
  in response to the highest similarity being not lower than the similarity threshold, merging the two clusters corresponding to the highest similarity to obtain a second target cluster; and
  updating the initially determined current cluster based on the second target cluster, and returning to determining the similarities between every two clusters in the initially determined current cluster.

13. An electronic apparatus, comprising:
  a processor; and
  a memory storing an instruction set that, when executed by the processor, causes the processor to:
    obtain, at a current moment, to-be-processed audio data comprising a stream of digital audio samples, and extract, in real time using a voiceprint recognition model, a current voiceprint feature online from the to-be-processed audio data, the extracting comprising deleting noise data from the to-be-processed audio data to obtain target data and determining the current voiceprint feature from the target data;
    obtain, from the memory, at least one historical cluster at a moment before the current moment, the at least one historical cluster being obtained by clustering at least one historical voiceprint feature corresponding to at least one historical user, and each historical cluster corresponding to at least one historical voiceprint feature of one historical user and being associated with a user label of the historical user;
    perform offline clustering on the current voiceprint feature based on the at least one historical cluster to obtain a current cluster, the current cluster being associated with a user label of a user to whom the voiceprint feature corresponding to the current cluster belongs, the current cluster including at least one cluster corresponding to the current voiceprint feature;
    based on the user label associated with the historical cluster and the user label associated with the current cluster, determine a user label mapping relationship online; and
    based on the user label mapping relationship, update the user label of the user to whom the current voiceprint feature belongs online in the current cluster, and output an updated user label of the current voiceprint feature, such that audio data of a same user from continuous multi-user audio data is clustered into a same category.

14. The apparatus according to claim 13, wherein the processor is further configured to:
   obtain the user label associated with the current cluster and the at least one user label associated with the at least one historical cluster;
   establish a label pair mapping relationship for each user label associated with the current cluster, each label pair mapping relationship including a matching factor between the user label associated with the current cluster and a user label associated with each historical cluster, the matching factor representing a matching degree between the user label associated with the current cluster and the user label associated with each historical cluster;
   determine a matching factor with a matching degree satisfying a condition in each label pair mapping relationship; and
   based on the matching factor with the matching degree satisfying the condition, determine a mapping relationship between the user label associated with the current cluster and the user label associated with the historical cluster.

15. The apparatus according to claim 14, wherein:
   each label pair mapping relationship is obtained by performing comparison in pairs on the user label associated with the current cluster and the user label associated with each historical cluster; and
   the processor is further configured to:
      based on the label pair mapping relationship, obtain N groups of matching factors, each group of matching factors including a matching factor of the label pair mapping relationship, N being smaller than a number of user labels of the historical cluster; and
      determine a group of matching factors with a largest sum of matching factors in a plurality of groups of matching factors as the matching factor with the matching degree satisfying the condition of the label pair mapping relationship.

16. The apparatus according to claim 13, wherein the processor is further configured to:
   based on the updated user label of the current voiceprint feature, update the user label associated with the current cluster; and
   based on the updated user label associated with the current cluster, update at least some user labels output at the moment before the current moment.

17. The apparatus according to claim 13, wherein the processor is further configured to:
   obtain a plurality of historical voiceprint features before the current moment;
   by using each historical voiceprint feature as an original historical cluster, determine similarities between every two original historical clusters, and merge two original historical clusters with a highest similarity into one historical cluster to obtain at least one historical cluster;
   in response to a number of the at least one historical cluster not reaching a predetermined number, return to determining the similarities between every two original historical clusters until the number of the at least one historical cluster reaching the predetermined number, and save the at least one historical cluster;
   wherein, the predetermined number is greater than or equal to a number of users corresponding to the plurality of historical voiceprint features before the current moment.

18. The apparatus according to claim 13, wherein the processor is further configured to:
   determine initially a current cluster using the current voiceprint feature as a first target cluster, the initially determined current cluster including the first target cluster and the at least one historical cluster;
   determine similarities between every two clusters in the initially determined current cluster;
   determine whether a highest similarity among similarities between every two clusters is lower than a similarity threshold;
   in response to the highest similarity being lower than the similarity threshold, end clustering, and obtain the current cluster;
   in response to the highest similarity being not lower than the similarity threshold, merge the two clusters corresponding to the highest similarity to obtain a second target cluster; and
   update the initially determined current cluster based on the second target cluster, and return to determining the similarities between every two clusters in the initially determined current cluster.

\* \* \* \* \*